United States Patent [19]
Walker

[11] Patent Number: 5,110,500
[45] Date of Patent: May 5, 1992

[54] POLYSILOXANE SCINTILLATOR COMPOSITION

[75] Inventor: James K. Walker, Gainesville, Fla.

[73] Assignee: University of Florida, Gainesville, Fla.

[21] Appl. No.: 492,452

[22] Filed: Mar. 13, 1990

Related U.S. Application Data

[63] Continuation-in-part of Ser. No. 239,793, Sep. 2, 1988, abandoned.

[51] Int. Cl.⁵ .............................................. C09K 11/06
[52] U.S. Cl. ............................ 252/301.16; 252/301.17
[58] Field of Search ....................... 252/301.16, 301.17

[56] References Cited

U.S. PATENT DOCUMENTS

| | | | |
|---|---|---|---|
| 3,457,180 | 7/1969 | Kretz et al. | 252/301.17 |
| 3,600,445 | 8/1971 | Wirth et al. | 252/301.17 |
| 3,666,683 | 5/1972 | Maeder et al. | 252/301.17 |
| 4,017,738 | 4/1977 | Hyman, Jr. | 252/301.17 |
| 4,173,495 | 11/1979 | Rapp et al. | 252/301.35 |
| 4,578,213 | 3/1986 | Simonetti | 252/301.17 |
| 4,620,939 | 11/1986 | Maeda et al. | 252/301.17 |
| 4,713,198 | 12/1987 | Simonetti | 252/301.17 |

Primary Examiner—Prince Willis, Jr.
Assistant Examiner—Jerry D. Johnson
Attorney, Agent, or Firm—Kerkam, Stowell, Kondracki & Clarke

[57] ABSTRACT

A plastic scintillator useful for detecting ionizing radiation comprising a matrix which comprises an optically transparent polysiloxane having incorporated therein at least one ionizing radiation-hard fluor capable of converting electromagnetic energy produced in the polysiloxane upon absorption of ionizing radiation to detectable light.

17 Claims, No Drawings

POLYSILOXANE SCINTILLATOR COMPOSITION

BACKGROUND OF THE INVENTION

Research leading to completion of the invention was conducted under Grant No. DE-FG05-86ER40272 from the Department of Energy. The United States Government has certain rights to the invention described herein.

RELATED APPLICATIONS

This application is a continuation-in-part of application Ser. No. 07/239,793 filed Sep. 2, 1988 now abandoned.

FIELD OF THE INVENTION

The present invention relates to novel plastic scintillators.

DESCRIPTION OF THE PRIOR ART

Scintillation materials are used in the detection and measurement of radiation. Scintillators are composed of substances which are capable of absorbing energy given off by ionization radiation, e.g., the fission fragments emitted by radioactive elements. The absorbed energy excites fluorescent materials (fluors) contained in the scintillator, such that the fluorescent materials give off light. Such scintillators are useful in many different applications, e.g., the detection of radioactive mineral deposits, and the detection and measurement of radioactive contamination.

When radiations comprising electrically charged particles such as α-rays and β-rays penetrate a certain substance, they ionize, excite or dissociate atoms or molecules of the substance at the cost of their energy. On the other hand, the energy thus lost by the radiation and accumulated in the substance is either converted into energy in the form of thermal movement or merely emitted in the form of electromagnetic waves. Where the substance penetrated by the radiation is fluorescent or phosphorescent or contains a fluor, a fair portion of the energy produced is converted and emitted in the form of light, usually of a wavelength in the visible zone. This phenomenon of conversion of energy produced by irradiation with ionizing radiation and light emission is termed "scintillation." In the case of radiation comprising gamma-rays and neutron rays which are devoid of electric charge, a similar phenomenon is induced by the action of secondary charged particles which are produced when the radiations interact with a substance. Generally, therefore, this phenomenon is widely utilized for the detection and measurement of ionizing radiation.

Substances capable of causing the scintillation are generally called scintillators. Examples of scintillators are inorganic crystals, e.g., sodium iodide activated by thallium, organic crystals, e.g., anthracene, organic solutions, e.g., xylene solution of terphenyl and plastic scintillators, e.g., terphenylpolystyrene. These substances are extensively used as luminous bodies for the detection of ionizing radiation. Plastic scintillators are easy to handle and are readily moldable in desired large shapes and, owing to these merits, have come to find utility as indispensable devices in the field of research on cosmic rays and research on high-energy physics by use of particle accelerators. In recent years in the field of high-energy physics, development of large particle accelerators has increased demand for a great quantity of large plastic scintillators. Of the properties required of efficient plastic scintillators, high processibility is important in addition to those basic properties of scintillators in general, e.g., amount of emission and transparency, etc.

The transparent resins heretofore used in plastic scintillators have been limited to styrene-based resins such as, for example, polystyrene and polyvinyl toluene. The plastic scintillators using these resins as their matrix resin have suffered from the disadvantage that they tend to develop microcracks on their surface due to a variety of reasons. For example, plastic scintillators currently in use more often than not utilize the entire reflection of light on the inner surfaces thereof to permit effective transfer of o the light generated therein to a detector such as a photomultiplier tube. The plastic scintillator, therefore, is generally used in a highly polished state. The plastic scintillator which uses the conventional styrene-based resin, however, is liable to sustain cracks when it is polished or when it is subjected to mechanical stress. When the scintillator is wiped with a solvent such as alcohol to have its surface cleaned, it tends to sustain cracks while in use. Because of these drawbacks, the conventional styrene-based plastic scintillators, despite the outstanding merit of high emission efficiency, call for advanced skill and great toil on the part of users engaging in the work of polishing and handling these plastic scintillators. In applications which demand heavy consumption of large plastic scintillators, therefore, the conventional styrene-based plastic scintillators have not necessarily proved quite practical.

To overcome the drawbacks mentioned above, plastic scintillators using inexpensive acrylic resin as matrix resin have been developed in recent years. The acrylic polymers are primarily employed for cost effectiveness in the fabrication of large volume scintillators.

The generation of light from plastic scintillators is accomplished through the addition of small amounts of many different combinations of organic molecules known to have fluorescent properties of high efficiency, e.g., p-terphenyl and naphthalene.

Hyman, Jr., U.S. Pat. No. 3,886,082, issued May 27, 1975, discloses an example of one such plastic scintillator material. The scintillator disclosed in Hyman employs acrylic polymers and copolymers as the host plastic and bis(o-methyl styryl)benzene, perylene, tetraphenylbutadiene, diphenylanthracene, bis(phenyloxazolyl benzene) and dimethyl bis(phenyloxazolyl benzene) as the fluorescent additive.

Siegrist et al, U.S. Pat. No. 4,180,479, issued Dec. 25, 1979, discloses the use of various stilbene derivatives as fluorescent agents in scintillators.

Rapp et al, U.S. Pat. No. 4,173,495, issued Nov. 6, 1979, discloses a "solar collector" comprising a thin film polysiloxane containing a luminescent material and its use in a photovoltaic solar cell. The luminescent material is selected so as to be capable of absorbing solar radiation; hence, the system would be incapable of use in a scintillator for detecting or measuring ionizing radiation.

The prior art scintillators have the disadvantage that none of the host polymers has been found suitable for use at temperatures above 100° C. For example, the maximum temperature of non-cross-linked polyvinyl toluene is 75° C., while that of cross-linked polyvinyl toluene is 100° C.

Moreover, unlike styrene-based resins, acrylic resin itself is not a scintillator. These plastic scintillators, therefore, have a fatal disadvantage that they are deficient in the emission efficiency which constitutes the basic property for plastic scintillators. This particular disadvantage is corrected to some extent by having a scintillating substance such as, for example, naphthalene or styrene dissolved in a high concentration in the acrylic resin [*Nuclear Instruments and Methods*, Vol. 169, pages 57-64 (1980)]. Since these improved scintillators contain the scintillating substance in a high concentration, they are inevitably deprived of the outstanding mechanical properties inherent in acrylic resin. Generally, as the scintillating substance to be contained in a high concentration in the acrylic resin, naphthalene is used in an amount of 1 to 15% by weight in due consideration of solubility and cost. Plastic scintillators incorporating naphthalene have a disadvantage that the time for the attenuation of light which ensues from the penetration of the scintillators by radiation is long, i.e., the response of the scintillators to the radiation is slow. These drawbacks restrict the range of applications found for the plastic scintillators using an acrylic resin as the matrix resin.

It is well known, as noted above, [Mattem et al, *IEEE Trans. Nucl. Sci.*, NS-21, Vol. 81 (1974)] that currently employed plastic scintillators are rather sensitive to radiation damage. None of the existing plastic scintillators meets the requirements of the proposed Superconducting Super Collider in the United States and the Large Hadron Collider in Europe in terms of radiation stability. Plastic scintillators currently used as detectors suffer serious optical degradation after only one Mrad dose, whereas existing and future high energy accelerators will expose such detectors to annual radiation doses as high as 10 Mrad. It has been shown that, for the widely used polystyrene- and polyvinyl toluene-based scintillators, radiation-induced loss of light output is primarily the result of a reduction in the transmission capability of the plastic in the wavelength region of the fluor emission. The loss of transmission of the plastic is so great (for example, 38% through 1 cm at 425 nm after 3 Mrad in air for polyvinyl toluene) that other contributions to the radiation-induced loss of the light output can be considered secondary.

The radiation "hardness" (stability under conditions of irradiation insofar as preserving the light production and transmission capability of the scintillator) plays a critical role in the overall scintillator stability. A fluor which is not radiation "hard" may result in a decrease of light output because of damage to the emitting center (chromophore) as a result of the radiation damage to the fluor. [Marini et al, "Radiation Damage to Organic Scintillation Materials," CERN 85-08, Geneva, Switzerland (Jun. 26, 1985)]. Color centers may be produced upon irradiation by unimolecular rearrangements of the dye. These color centers can cause additional loss in transmission responsible for additional reductions in scintillation efficiency of the detector. Hence, the energy calibration of the scintillator changes with time and becomes highly dependent on the location of energy deposition.

To meet present day requirements mainly in the field of high energy physics and space science, it is desirable to have a plastic scintillator detector with at least one hundred times the radiation resistance of presently available plastic scintillators. These new demanding requirements are created by the higher energy and increased radiation associated with the new atom smashers such as the upgraded facilities at Fermi National Laboratory, Chicago, Ill.; the Large Electron position Facility in Geneva, Switzerland; and the projected superconducting super collider in the United States. In addition, extended space flights of several years duration with scintillation detectors have shown substantial degradation of scintillator performance due to radiation damage.

A radiation "hard" scintillating plastic is a detector which continues to function even after a massive dose, e.g., up to more than $10^7$ rads, of radiation has been incident on the plastic. A scintillating plastic is referred to as "fast" if the emitted light occurs in a short time of about one nanosecond ($10^{-9}$ seconds) after the passage therethrough of the ionizing radiation.

It is an object of the present invention to provide a novel, fast, radiation-hard scintillating plastic useful as a radiation detector which is not subject to the above-noted disadvantages associated with plastic scintillators utilized heretofore.

SUMMARY OF THE INVENTION

The above and other objects are realized by the present invention which provides a fast, radiation-hard plastic scintillator useful for the detection or measurement of ionizing radiation comprising a matrix with at least one polysiloxane having incorporated therein at least one primary fluor;

(a) the polysiloxane(s) having a structure and being composed such that the matrix maintains substantial optical transparency upon exposure to ionizing radiation, particularly, and critically, in cases where the scintillator is to be employed in environments comprising high levels of such radiation, i.e., to a massive amount (more than $10^7$ rads) of ionizing radiation and which, upon the passage of ionizing radiation therethrough, converts at least a portion of the ionizing radiation to electromagnetic energy having a wavelength of 330 nm or less; and (b) the fluor(s) being substantially radiation-hard and capable of absorbing at least a portion of the electromagnetic energy emitted by the polysiloxane, and converting it to detectable or measurable light of longer wavelength.

DETAILED DESCRIPTION OF THE INVENTION

The present invention is predicated on the discovery that certain polysiloxanes possess excellent optical transmission characteristics and are extremely radiation "hard," i.e., resistant to damage when exposed to ionizing radiation at doses as high as several times $10^7$ rad.

For the same impairment to optical transmission in the visible range, the polysiloxanes of the present invention, when compared to the organic polymers or plastics presently used in scintillators, can sustain approximately one hundred times the radiation dose. The degree of physical hardness/flexibility of the polysiloxanes can also be tailored by the choice of appropriate organic substituents on the sides of the siloxane chain. Copolymers of two or more of the siloxanes may also be utilized.

Polysiloxanes of the following structural formula which are substantially optically transparent may be employed in the practice of the invention:

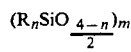

wherein
n is an integer from 1 to 3;
m is the degree of polymerization; and
R may be the same or different where n is 2 or 3 and is, e.g., lower alkyl such as methyl and ethyl; cycloalkyl, such as cyclohexyl; phenyl, biphenyl, naphthyl, vinyl, hydrogen or other bulky aromatic group.

A polysiloxane of the invention wherein R is entirely methyl has no scintillating properties. It, therefore, requires incorporation therein of large amounts of a scintillating substance such as naphthalene, p-terphenyl or styrene.

In a polysiloxane of the invention wherein some R groups are phenyl, the polymer itself has scintillating characteristics. The polymer can then more efficiently transfer electromagnetic energy into the dissolved fluorescent organic additives. Thus, phenyl-substituted polysiloxanes require lesser amounts of dissolved scintillator and are preferred. The light output from the polysiloxane scintillator depends upon the phenyl concentration of the polymer. In addition, phenyl groups enhance the bulk modulus, radiation resistance and mechanical properties of the plastic.

It is critical to the practice of the invention that the polysiloxane be substantially optically transparent, i.e., that it be capable of efficiently transmitting the light emitted by the fluor for detection and a measurement even under severe conditions of irradiation with ionizing radiation.

The polysiloxanes need not necessarily be linear. They may contain branch points such as:

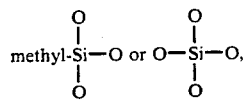

which introduce rigidity into the structure.

In a polysiloxane wherein some R groups are vinyl and others are hydrogen, cross-linking can occur with a resulting increase in toughness, tensile strength and dimensional stability of the plastic.

For the preparation of polysiloxane plastic scintillators, combinations of the above substituents have been used to produce a material with particularly desired properties. For example, the copolymer, dimethyldiphenylsiloxane and blends of copolymers such as methylhydrodimethylsiloxane with vinyl terminated dimethyldiphenylsiloxane copolymer produce desirable results.

The degree of polymerization m is at least 2. The upper limit will depend in each instance upon the nature of the R substituent and the desired properties of the resulting polymer. Those skilled in the art will be capable of determining the upper limit of the degree of polymerization for each application without the exercise of undue experimentation.

Low molecular weight polysiloxanes are liquids which, if they are optically transparent and contain significant phenyl substituents, can act as excellent liquid scintillators when small amounts of organic scintillating compounds such as p-terphenyl are dissolved therein. These liquid scintillators also exhibit high radiation resistance to degradation.

The term "optically transparent" as used herein is defined as the ability of a material to transmit light at a given wavelength with high efficiency throughout the length of the material.

The term "radiation-hard" as used herein is defined as the ability of a material to retain its optical properties, such as optical transparency or fluorescent light output, after being exposed to a massive dose of ionizing radiation of at least $10^7$ rads.

Scintillating substances may be incorporated into the polysiloxane in a variety of ways.

The scintillators may be dissolved in the siloxane monomer prior to polymerization such that they are distributed or dissolved in the resulting plastic.

Alternatively, the scintillating substance may be covalently bonded to the siloxane monomer such that, upon polymerization, it is covalently bonded to the polymeric molecule itself.

Suitable radiation hard scintillating substances which may be employed in the practice of the invention include aromatic hydrocarbons such as the oligophenylenes, e.g., p-terphenyl, indeno-fluorene, p-quaterphenyl, p-quinquephenyl, diphenylanthracene, dimethylterphenyl, dimethylquaterphenyl, d-t-amylterphenyl, 4,4″bis(3-methyl-3-pentyl)terphenyl and the higher oligophenylene analogues.

Another class of suitable scintillating substances with good radiation stability is the class of oligomers of disubstituted 1,3,4-oxadiazoles which have alkoxy groups in the para position of the exterior phenyl rings.

The matrix may also comprise a blend of interpenetrating network of a polysiloxane described above and another polymer, e.g., polystyrene, polycarbonate, polymethylmethacrylate, polyester and mixtures thereof.

The solubility of the oligophenyls can be modified by several techniques, one of which is the introduction of a polar ionic functional group, e.g., carboxylate preferably on a bridging carbon or other saturated carbon, and another is the substitution of methyl or more complex groups at the 1 or 2 positions on terminal phenyl rings.

The solubility of each fluor in each prepolymer is different and the particular suitability of a method for incorporating the fluor in the polysiloxane depends on the concentration of fluor which is desired. Optimal concentrations of the fluors in the polysiloxane have been found to be in the range of from about 0.1 to about 1.5% by weight; however, concentrations in the range of from about 0.01 to about 10% by weight are also operable.

For some applications, it is useful to introduce one or more secondary ionizing radiation-hard fluors into the polymer. The second fluor may be used to absorb the light emitted by the first fluor and re-emit light at a longer wavelength. These secondary fluors have been referred to heretofore as "wavelength-shifters." The longer wavelength light may be a better match to the particular photo-sensitive detector external to the plastic scintillator. In addition, the longer wavelength light is less attenuated over long paths by the polymer after it has been exposed to very high radiation doses. It is preferred to employ a secondary fluor with a large Stokes shift, e.g., one which absorbs at wavelengths in the range of from about 340 to about 380 nm and emits at a wavelength greater than about 450 nm.

Suitable wavelength shifters include diphenyl stilbene benzimidazo-benzisochinolin-7-on, 7-azamidole, 1,4-bis-[2-(5-phenyloxazolyl)]-benzene, p-bis(o-methylstyryl)benzene, 1,1,4,4-tetraphenylbutadiene, 3-hydroxy-flavone, coumarin and a six-ring soluble oligophenyl 7,7'-bis(4-methoxyphenol)-9,9,9',9'-tetrakis-(2-methoxyethyl)-2,2'-bifluorene.

The polysiloxane containing a covalently bonded scintillating substance may be prepared by synthesizing one of the above scintillating substances with a vinyl substituent. The scintillating compound is mixed with a prepolymer which contains an R substituent which is hydrogen. Polymerization is then permitted to occur. The scintillating substance forms a covalent bond with the polymer through the reaction of the vinyl group and the hydrogen atom of the siloxane. Alternatively, the scintillating substance with a vinyl substituent is mixed with a prepolymer which contains an R substituent which is a vinyl group in a side chain or in a terminal position. Polymerization via a peroxide catalyst covalently bonds the scintillator to the polymer.

Any conventional method for forming the polysiloxane may be employed. However, the types of substituents (R's), branching and molecular weight of a silicone polymer will define the optimal method of cure, cross-linking or polymerization. The high temperature vulcanizing (HTv) system approach is preferably used for polymers containing methyl or vinyl groups. Cross-linking is achieved by addition polymerization with peroxides acting as catalysts. The prepolymer and catalyst are mixed and then heated to 100° C.-150° C. for a short period of about one hour depending upon the properties of the prepolymer. During this time, the mixture is kept under vacuum to ensure the absence of bubbles of gas in the final product.

A second general method of addition polymerization which may be employed is the use of a platinum complex to catalyze the addition of silicone hydrides to vinyl side chain-substituted or terminated polymers. The hydrosilation reaction occurs in the presence of 5-10 ppm platinum at elevated temperatures, e.g., about 150° C., for a period of twenty minutes or more.

A third general method is the reaction between polyhydrosiloxane polymers and silanol terminated polymers in the presence of metal salts such as tin octoate or zinc octoate. The polymer is cured at 100° C.-150° C. Hydrogen gas is eliminated during the polymerization and the reaction must therefor take place under a vacuum.

An additional method involves condensation of silanol-terminated prepolymers. This reaction is acid catalyzed with water being a condensation product.

EXAMPLE 1

An experiment was conducted employing dimethylquaterphenyl as a fluor and a cross-linked vinyl-terminated polymethylphenyl siloxane. The ratio of methyl to phenyl was 4 to 1. vinyl-terminated polymethylphenyl siloxane (10 parts) containing a $3 \times 10^{-3}$ molar concentration of dimethylquaterphenyl was admixed with one part of a prepolymer crosslinker consisting of methylhydrosiloxane and methylphenylsiloxane units. The mixture was poured into $1.5 \times 1.5$ cm glass molds and cured with a platinum catalyst for twenty minutes at 150° C. The sample was excited by exposure to a $^{60}Co$ source at a dose rate of about 140 Krad/hour. The characterization of this scintillating plastic was performed as follows: The light output of the scintillating plastic was measured using an Americium alpha source under an argon atmosphere as a function of radiation exposure up to 10 Megarads. The light output was found to be stable to within ±10% throughout this radiation exposure. The emission was maximum at 364 nm.

This result can be compared to data obtained under identical conditions using a commercial plastic scintillator, Nuclear Enterprises type 102A. This latter scintillator has a plastic matrix of polyvinyltoluene. Approximately 2% by weight of p-terphenyl and 0.1% by weight of (1,4-bis-[2-(5-phenyloxazolyl)]-benzene (POPOP) are dissolved in the plastic to act as a primary fluorescent substance and a waveshifter substance, respectively. The light output of this commercial scintillator showed a 75% loss of light for the same radiation exposure.

EXAMPLE 2

Another experiment was conducted with the same siloxane plastic base and primary fluor, but this time including a secondary fluor, 1,1,4,4-tetraphenylbutadiene (TPB) acting as a wavelength shifter. The concentration of primary and secondary fluors were $4 \times 10^{-3}$ and $2 \times 10^{-3}$ mol/l, respectively. The plastic scintillator was polymerized as in Example 1. The light emission was found to be maximum at 450 nm in this case due to the wavelength shifter fluor. The output light was found to have a fast fluorescence time of 1.6 n seconds. As in Example 1, the plastic scintillator was exposed to ionizing radiation from a cobalt source and the light output was found to be stable to ±10% for a total exposure of 10 Megarads.

These two results demonstrate that the novel scintillator described in this invention is both fast and radiation-hard as defined hereinabove. Therefore, the novel scintillator is not subject to the disadvantage of previous plastic scintillators in their susceptibility to damage by ionizing radiation.

I claim:
1. A plastic scintillator useful for the detection or measurement of ionizing radiation consisting essentially of at least one substantially optically transparent polysiloxane matrix having incorporated therein at least one primary fluor;
   a) said at least one polysiloxane having a structure and being composed such that, upon absorption of ionizing radiation, converts at least a portion thereof to electromagnetic energy having a wavelength of 330 nm or less in about one nanosecond;
   b) said at least one fluor being capable of absorbing at least a portion of said electromagnetic energy and converting it to detectable or measurable light; and
   c) said at least one polysiloxane being capable of maintaining said substantial optical transparency and said at least one fluor being stable to exposures of said ionizing radiation at doses of at least $10^7$ rads.

2. The plastic scintillator of claim 1, wherein said fluor(s) are incorporated in said polysiloxane(s) matrix by dissolution.

3. The plastic scintillator of claim 1, wherein said fluor is incorporated in said matrix by covalent bonding to said polysiloxane(s).

4. The plastic scintillator of claim 1, wherein said matrix has incorporated therein from about 0.01 to about 10% by weight of said fluor.

5. The plastic scintillator of claim 1, wherein said polysiloxane(s) have the formula;

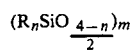

wherein
- n is an integer from 1 to 3, inclusive;
- m is the degree of polymerization; and
- R may be the same or different where n is 2 or 3 and is selected from the group consisting of lower alkyl, cycloalkyl, phenyl, biphenyl, naphthyl vinyl, hydrogen or other bulky aromatic group.

6. The plastic scintillator of claim 5, wherein said polysiloxane is polydimethylsiloxane.

7. The plastic scintillator of claim 5, wherein said polysiloxane is polydiphenylsiloxane.

8. The plastic scintillator of claim 5, wherein said polysiloxane is a copolymer of dimethylsiloxane and diphenylsiloxane.

9. The plastic scintillator of claim 5, wherein said polysiloxane is a copolymer of methylphenylsiloxane and diphenylsiloxane.

10. The plastic scintillator of claim 1, wherein said polysiloxane is liquid.

11. The plastic scintillator of claim 1, wherein said matrix comprises a copolymer, blend or interpenetrating network of a polysiloxane and another polymer.

12. The plastic scintillator of claim 11, wherein said other polymer is selected from the group consisting of polystyrene, polycarbonate, polyester and mixtures thereof.

13. The plastic scintillator of claim 1, wherein said fluor is an aromatic hydrocarbon.

14. The plastic scintillator of claim 1, wherein said fluor is an oligophenylene or an oxadiazole.

15. The plastic scintillator of claim 1, wherein said fluor is selected from the group consisting of p-terphenyl, indeno-fluorene, p-quaterphenyl, p-quinquephenyl, diphenylanthracene, dimethylterphenyl, dimethylquaterphenyl and an oxadiazole.

16. The plastic scintillator of claim 1, wherein said polysiloxane has incorporated therein at least one ionizing radiation-hard secondary fluor capable of absorbing the light emitted by said primary fluor and re-emitting said light at a longer wavelength.

17. The plastic scintillator of claim 16, wherein said secondary fluor is selected from the group consisting of diphenyl stilbene, benzimidazo-benzisochinolin-7-on, 7-azamidole, 1,4-bis[2-(5-phenyloxazolyl)]-benzene, p-bis(o-methylstyryl)-benzene, 1,1,4,4-tetraphenylbutadiene, 3-hydroxyflavone, coumarin and 7,7'-bis(4-methyoxyphenol)-9,9,9',9'-tetrakis-(2-methoxyethyl)-2,2'-bifluorene.

* * * * *